(12) United States Patent
Klaas et al.

(10) Patent No.: US 8,608,084 B2
(45) Date of Patent: Dec. 17, 2013

(54) FINANCIAL CARD WITH EMBEDDED CIRCUIT LOCK TECHNOLOGY

(76) Inventors: Steve Klaas, Mayville, WI (US); Thomas J. Pennaz, Champlin, MN (US)

( * ) Notice: Subject to any disclaimer, the term of this patent is extended or adjusted under 35 U.S.C. 154(b) by 0 days.

(21) Appl. No.: 13/250,685

(22) Filed: Sep. 30, 2011

(65) Prior Publication Data

US 2012/0111949 A1    May 10, 2012

Related U.S. Application Data (60) Provisional application No. 61/388,139, filed on Sep. 30, 2010.

(51) Int. Cl.
*G06K 19/06*    (2006.01)

(52) U.S. Cl.
USPC ............................................. 235/492

(58) Field of Classification Search
USPC .................................. 235/380, 492, 488
See application file for complete search history.

(56) References Cited

U.S. PATENT DOCUMENTS

| | | | |
|---|---|---|---|
| 6,863,220 B2 * | 3/2005 | Selker ........................... | 235/492 |
| 6,910,636 B2 * | 6/2005 | Kim et al. ..................... | 235/492 |
| 7,731,094 B2 * | 6/2010 | Phillips ......................... | 235/492 |
| 7,748,608 B2 * | 7/2010 | Tanner et al. ................. | 235/375 |
| 7,900,843 B2 * | 3/2011 | Tanner et al. ................. | 235/492 |
| 8,136,735 B2 * | 3/2012 | Arai et al. ..................... | 235/492 |
| 2008/0149735 A1 * | 6/2008 | Kozlay .......................... | 235/492 |

* cited by examiner

*Primary Examiner* — Seung Lee
(74) *Attorney, Agent, or Firm* — Joseph S. Heino; Patrick M. Bergin (57) ABSTRACT

The claimed invention is directed to a contactless card, an inlay for a contactless card or a circuit embedded within a contactless card containing a radio frequency identification ("RFID") circuit that is only actuated when the card is flexed. The RFID circuit comprises an antenna comprising a first conductive lead, a second conductive lead; and an RFID chip connected to the antenna. A dielectric layer having an aperture is embedded in between the antenna and a bridge, the aperture in the dielectric layer being situated between the first conductive lead and the second conductive lead of the antenna. Normally, the bridge is biased away from the first conductive lead and the second conductive lead. When the card is flexed, the bridge is biased into contact with the first conductive lead and the second conductive lead thereby completing the circuit.

25 Claims, 5 Drawing Sheets

FINANCIAL CARD WITH EMBEDDED CIRCUIT LOCK TECHNOLOGY

PRIORITY

This application claims the benefit and priority of U.S. Provisional Patent Application No. 61/388,139 filed Sep. 30, 2010.

BACKGROUND OF THE INVENTION

1. Field of Invention

The claimed invention relates to contactless cards used in the financial, personal identification and security industries. More specifically, it relates to a card or token with embedded circuit lock technology which is activated by flexing the card for contactless transfers of information.

2. Description of the Related Art.

Cards used in the financial and personal identification and security business have had a dramatic impact on commerce. Traditional cards have a magnetic strip embedded thereon which can be read by inserting the card into a reader, or by swiping the card past a reader. Modern developments to cards have added electronic features such as contactless data transfer, electronic data displays and dual interface cards. Contactless cards employ passive radio frequency identification ("RFID") technology to transmit secure account information to a radio frequency ("RF") receiver for payment.

A "passive" RFID circuit is one that does not contain a battery, that is, the power to read the RFID tag is supplied by the reader. When radio waves from the reader are encountered by a passive RFID tag, the coiled antenna within the tag forms a magnetic field. The tag draws power from it, energizing the circuits in the tag. The tag then sends the information encoded in the tag's memory. Additionally, display circuits have been added to financial cards which provide one time passwords ("OTP"), display the current financial balance on the card or display bonus points or the like.

A major disadvantage of passive RFID is that a reader that is powerful enough can read the tags from a long distance, thereby leading to the potential for identity theft and fraud. Therefore, it would be highly advantageous to provide a circuit lock which can be easily and reproducibly activated to provide the desired electronic activity.

One solution is to secure contactless cards in a shielding sleeve when the card is not in use. While effective, this may not be practical, as the sleeves can be lost and/or damaged, and may interfere with the easy storage and retrieval of the cards from a wallet or the like.

U.S. Pat. No. 7,762,471 to Tanner describes an embedded switch in a pre-determined location in the card which requires the user to press the switch to activate the card. The location of the switch is indicated to the user through graphics or other surface indications to provide a means to communicate the switch location. However, significant limitations exist with this approach as the switch activation force varies from card to card as a result of the card manufacturing process. The result of this variation is a range of activations which range from very difficult to use to switches which are too easy to activate and inadvertently activate when it is undesirable (i.e. in the users wallet). The inherent variability of existing switches is very difficult to control in mass production and results in manufacturing complexity and increased cost.

Another limitation of embedding switches in a fixed location is the need to indicate the location of the switch to the user. This requirement consumes valuable graphics space which could be used for other purposes such as marketing or additional security features. Graphics space on financial cards is very limited and valuable and embedding a circuit lock mechanism which does not require identification of a specific location is highly advantageous.

Switches embedded in electronic cards also tend to change slightly over time. This results from aging of the card body through both standard aging processes and use. The expected lifetime of an electronic financial card is typically three years. During this period, the plastics used in the card harden slightly and use of the card introduces stresses and compression forces which alter the activation force of the switches. Therefore, the switch activation force can become either too easy or too difficult to activate after the passage of time or repeated use. A circuit lock which has the flexibility to account for both manufacturing variability and the aging process is highly desirable.

The fundamental difference between the use of traditional switches of the prior art and the circuit lock contemplated in the claimed invention is the mode of activation. The mode of activation of the prior art is the downward tactile force exerted by the user in a specific point location on the card. Typically, this force is generated by compressing the switch in the specified location with the finger of the user when the card is being held in the hand. Sufficient force must be applied to close the contacts of the switch, for a sufficient time, to perform the desired action. As the activation force increases, the effort required to close the switch and perform the desired function increases as well. As a wide range of users are expected, this increased activation force makes it very difficult for certain users to easily use the electronic card of the prior art. As previously mentioned, the activation force of the switch cannot be made too easy as inadvertent activation is often highly undesirable, especially in the case of contactless financial cards where the entire purpose of the switch is to prevent fraudulent reading of the antenna.

It would also be beneficial to provide a circuit lock mechanism that is easily concealed within the card and that would not require graphic space on the card body that indicates the manner of actuating the circuit.

It would be very beneficial to provide a circuit that can be used with any of the variety of card manufacturing processes that are employed today. The most common process provides a card structure that is formed by assembling various sheets of suitable plastics and fusing the sheets together through the use of heat and pressure to form a continuous structure. This process is known as "hot lamination." Alternatively, a process known in the art as "cold lamination" uses an adhesive, or combination of adhesives, to glue the various sheets together to form a continuous structure. Other manufacturing processes include reaction injection molding ("RIM"), warm lamination and casting to produce acceptable cards. The circuit lock of the claimed invention can be introduced into to card body constructions using all existing card manufacturing techniques without significant modification of the existing processes.

In addition, several standards exist for financial cards which have been adopted by the industry to specify dimensions, reliability, environmental performance and lifetime of financial cards. Most notably, the International Standardization Organization (ISO), International Electrotechnical Commission (IEC), American National Standards Institute (ANSI), and Information Technology Industry Council have published standards referred to as ISO/IEC 7810, 7816-1 and 10373-1. The circuit lock of the claimed invention is designed to meet these existing standards.

Embedding electronics into financial cards which meet the above mentioned standards has proven to create several challenges to the industry and has resulted in several modifications to the standard manufacturing processes summarized above. Most notably, the use of a so-called inlay has found commercial acceptance. In this process, a substructure, or inlay, is produced separately which houses the electrical components in a separate structure which forms the center of the financial card. This process produces a sheet whereby the electronics are placed into the structure according the desired positions and the structure is produced which is flat, free of surface defects, constructed of materials which will adhere to subsequent card layers and is of suitable thickness. This allows the card manufacturer to print the front and back graphics, add a magnetic stripe (if desired) as well as any other features and laminate the graphic layers to the inlay structure.

For example, a financial card which meets ISO standards has a nominal thickness of 0.030 inches which is composed of the various layers of films. In manufacturing processes which use the inlay approach, the inlay is typically manufactured to have a nominal thickness of 0.018 inches thereby leaving 0.012 inches available for the front and back graphic layers. Ideally, the circuit lock technology of the present invention would be composed of components which have thicknesses which allow for the manufacturing of an inlay to enable the use of this manufacturing process.

In view of the foregoing, what is needed is a circuit lock that meets all existing requirements, can be manufactured using known manufacturing techniques and that provides the security of a circuit lock to prevent identify theft and fraud.

SUMMARY OF THE INVENTION

The claimed invention provides a card with all of the standard features familiar to card users with the addition of a circuit lock for RFID technology. More specifically, the claimed invention provides a circuit lock for the RFID circuit where in the RFID circuit is actuated by flexing the card.

An additional object of the claimed invention is to provide an inlay for a card wherein the inlay comprises a circuit lock which is actuated by flexing the card. It is a further goal of the claimed invention to provide a circuit lock that is embedded in the card body and can be manufactured using existing manufacturing techniques known in the art at low cost and with reproducible results. According to another advantage of the present invention the card is robust and easy to use. According to a further advantage of the present invention, the card is preferably constructed of a standard shape and size, whereby it can easily be introduced into existing cards utilizing existing manufacturing processes.

According to a further advantage of the present invention, the claimed invention can be used in all electronic cards including, but not limited, to contactless, contact, dual interface and display cards which require interruption of the electronic circuits or to send an electrical pulse to an electronic component such as a microprocessor.

Beneficially, the action of flexing the card to activate the circuit lock eliminates many of the limitations of the prior art by incorporating a mechanism which does not require activation at a single point in the card body. Additionally, flexing the card is easily accomplished by a wide range of card users and the circuit lock mechanism variation which may occur due to abovementioned limitations of the prior art are eliminated as a slight variation in circuit lock activation force translates into a slightly lesser or greater degree of flexing in the card which would not be noticeable by the user.

Flexing the card translates into a force which is greatest at the centerline of the flex radius. This force is perpendicular to the face of the card and varies across the flex radius, greatest at the centerline and reduced proportionately as you move in either direction from the centerline along the radius of curvature. Therefore, the claimed circuit lock mechanism can be located in the center of the card and is activated by grasping the card on either edge and compressing, thereby forming a radius in the card body. Likewise, the radius could be formed by grasping a corner of the card and flexing the card body either forward or back. The circuit lock would be independent of the direction of the flex (forward or back) and rely solely on the radius induced through the flexing action.

Other advantages, benefits, and features of the present invention will become apparent to those skilled in the art upon reading the detailed description of the invention and studying the drawings.

DETAILED DESCRIPTION

Figure 2:
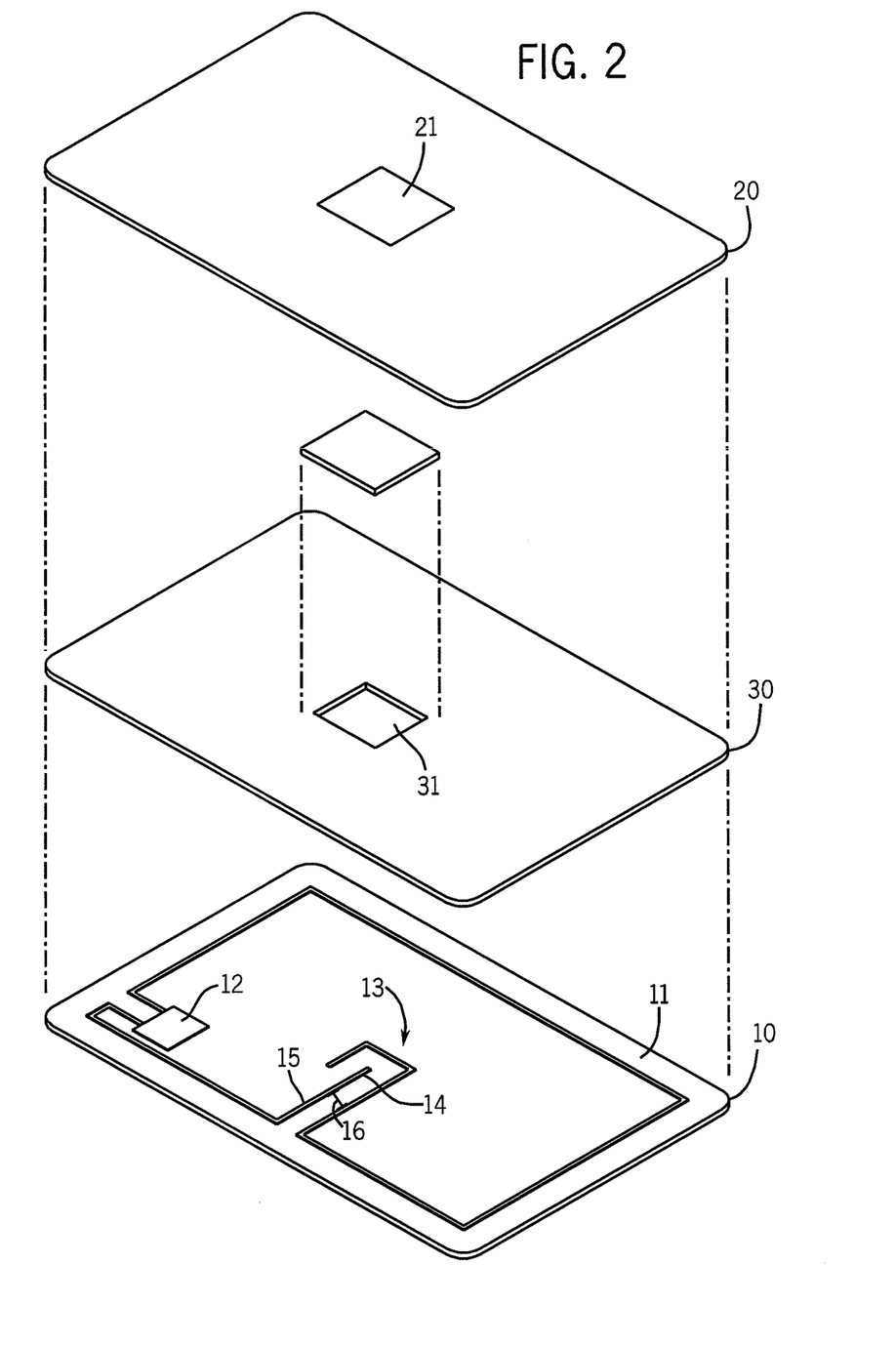
FIG. 2 is a top and side exploded view of the construction of a financial card with embedded circuit lock technology.

Now referring to the drawings in detail wherein like reference numerals refer to like elements throughout, FIG. 2 shows each of the layers involved in the construction of the circuit lock 1 of the claimed invention for a card such as a financial or personal identification card 3. As shown in FIGS. 2, the claimed invention can be constructed in three layers generally comprising a first substrate 10 on which the electronic circuit and any required components are placed, a second substrate 20 where the circuit completion segment is placed and a dielectric layer 30 which is placed between the first substrate 10 and the second substrate 20.

Figure 3:
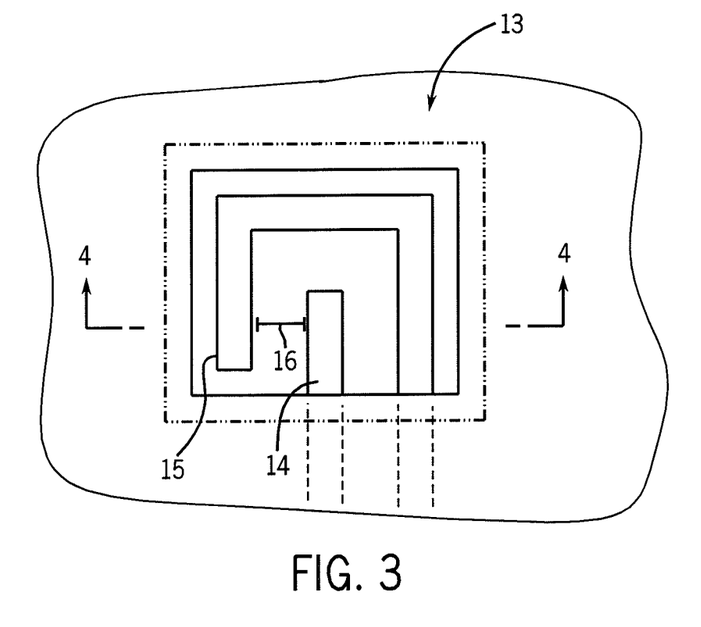
FIG. 3 is a top plan detail view of an exemplary circuit lock of the claimed invention.

The first substrate layer 10 generally comprises the antenna 11 which is electrically connected to the radio frequency identification chip (RFID) 12. As shown in more detail in FIG. 3, the antenna 13 comprises a circuit comprising two conductive leads 14, 15 separated by a gap 16 which effectively interrupts any transmission from the antenna circuit unless the two conductive leads 14, 15 are connected electrically. Circuit lock 13 can be configured with a wide range of geometries such as two single leads, one lead looped around as shown in FIG. 3, with inter-digitated fingers or the like. Those skilled in the art will recognize that a wide range of geometries are possible and the present invention is not limited by the specific geometry shown.

Referring to FIG. 2, the second substrate layer 20 comprises a conductive bridge circuit 21 designed to come into contact with the conductive leads 14, 15 of the antenna 11, as will be discussed later in this detailed description. FIG. 2 shows the dielectric layer 30, which is interposed between the first substrate layer 10 and the second substrate layer 20. The dielectric layer 30 provides a buffer between the first substrate layer 10 and the second substrate layer 20 and further comprises an aperture 31 of sufficient size such that the bridge circuit 21 can complete the circuit between the conductive leads 14, 15 of the circuit lock 13 when the card is flexed.

A secondary purpose of the dielectric layer 30 is to provide a buffer layer within the card body to planarize components such as the RFID chip 12. This is accomplished by die cutting the dielectric in the location of any components such that the components are nested within the dielectric buffer layer 30. In the case of the example, die cut 32 is placed in the location of the RFID chip 12 to allow the RFID chip 12 to nest between the first substrate 10 and second substrate 20 when the entire card body is assembled.

Figure 4:
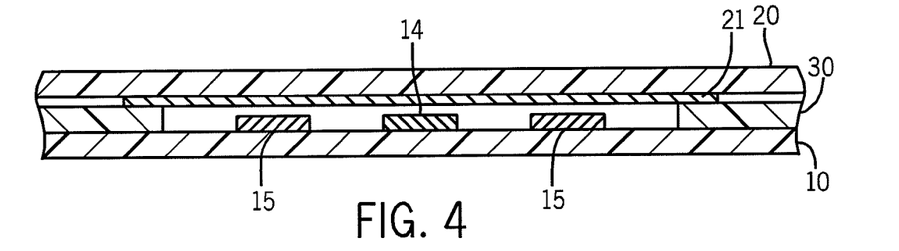
FIG. 4 is a side elevational cutaway view of the construction of an exemplary circuit lock of the claimed invention.

A top outline view of the an assembled circuit lock 13 is shown in more detail in FIG. 2, which shows the placement of the conductive leads 14, 15 of the antenna 11 under the circuit bridge 21, with the aperture 31 of the dielectric layer 30 interposed (in outline) between the circuit bridge 21 and the conductive leads 14, 15 of the antenna 11. Therefore, as shown in FIGS. 2 and 4, one embodiment of the circuit lock 13 comprises a multi-layer sandwich construction, although construction of the circuit lock could be accomplished using other known techniques such as RIM and casting.

The thickness of the dielectric layer 30 is important to the proper function of a card 3. Within the constraints of existing cards 3, it has been found to be desirable to use a dielectric thickness in the range of 0.003-0.015 inches. The preferred range of thickness is 0.005-0.010 inches and the most preferred range is 0.005-0.007 inches. As discussed above, the dielectric layer functions to electrically separate conductive leads 14, 15 of the antenna 13 from the conductive bridge 21 when the card body 3 is flat, flat being defined as less than 0.125" deflection when measured at the center of curvature of the card against a flat surface.

The aperture 31 in the dielectric layer 30 allows Part B to make electrical connection to Part A when the card body is flexed (defined as deflection of the card body of between 0.125"-0.500" when measured at the center of curvature of the card when measured against a flat surface). The thickness of the dielectric layer impacts of the width and length of the aperture and it has been found that the following ranges provide the desired flex activation within the card.

| Dielectric Thickness (in inches) | Aperture width (W) (in inches) | Aperture length (L) (in inches) |
|---|---|---|
| .003"-.006" | .125"-.250" | .125"-.250" |
| .006"-.010" | .200"-.325" | .200"-.325" |
| .010"-.015" | .300"-.500" | .300"-.050" |

Obviously, the card body 3 can be flexed without undue effort beyond 0.500 inches. However, it is desirable to minimize the level of flex required to activate the circuit lock 13 as to not introduce unnecessary stresses into the card body 3. It is anticipated that most users would only flex the card body 3 as far as necessary to achieve electronic activation thereby minimizing unnecessary stresses on the card body 3 through intentional over-flexing of the card body 3. The range of the acceptable flex deflection is sufficient to absorb any activation force variation inherent in traditional switches disclosed in the prior art which require point activation. Presuming a 25% variation in activation force between various cards, this is adequately compensated by providing a 400% range in flex deflection angles as described above. Conversely, a 25% variation in activation forces of traditional point or push-button activated switches easily produces switch variation which is unacceptable easy to activate at the low end and unacceptable difficult to activate at the high end.

The location of the circuit lock 13 in the card body 3 is flexible but should be located as close to the center of the card body 13 as possible. The most preferred method of activation of the circuit lock 13 is to grasp the card body 3 along the short edge of the card body 3 and to compress the card body thereby inducing a flex through the length of the card body 3. Other locations for the circuit lock 13 include locations such as a corner of the card body 3 or the like which could be activated by, for example, by pressing the corner of the card body 3 against a hard surface. Those skilled in the art will recognize that a wide range of flexing actions could be introduced which are within the spirit of the present invention.

Figure 5:
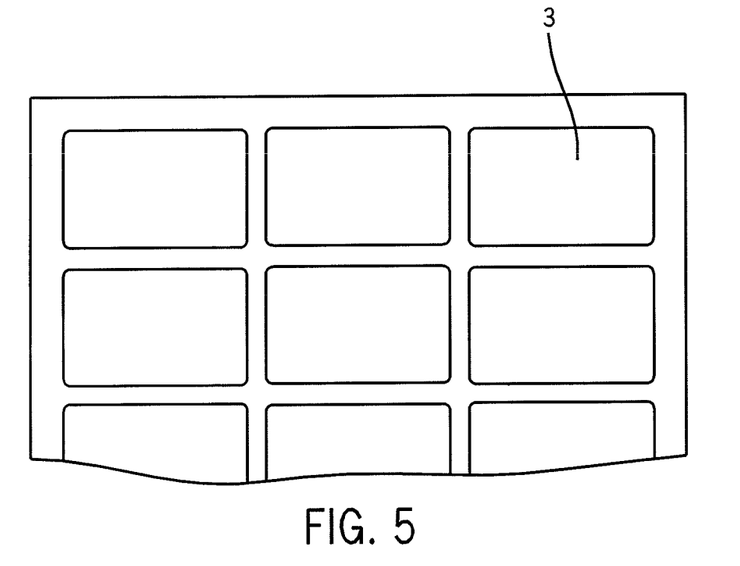
FIG. 5 shows a plan view of a partial three wide array of inlay circuits that could be produced using the claimed invention.

As shown in FIG. 5, in general, card manufacturing processes rely on sheet formation which contains multiple cards within each sheet. One such production sheet showing an 8×3 array of cards is illustrated. The production process is tightly controlled such that all individual layers are produced within the prescribed positional tolerance which allows for collation of each discreet sheet into a stack whereby all elements, namely the front graphics, first substrate layer 10, dielectric layer 30, additional buffer layers (as required) and second substrate layer 20 as well as any associated circuit elements meet the desired positional tolerances. The use of sheet production with multiple cards per sheet is common practice although the number of cards per sheet and the positional layout varies widely throughout the card manufacturing industry. The claimed invention is easily adopted to meet all sheet layouts as required by various card manufacturing processes.

Production of card bodies 3 with more features, such as those with data displays and batteries is complicated by the fact that such features have different thicknesses. Certain card bodies have electronic components such as integrated circuits, switches, light emitting diodes (LED), batteries, displays and the like have significant thickness variations and surface contour variations which will "show through" to the face of the card during card manufacturing. This can be addressed by building a three dimensional structure around the components by selecting films which match the heights of the various components and die cutting the various layers to match the area of each component thereby producing a three dimensional structure within the card body 3 and therefore embedding the electronic components within the three dimensional structure. Generally speaking, any electronic feature thicker the 0.005" must be embedded using buffer layers, or a combination of buffer layers to adequately produce a finished card free of surface defects which meets ISO standards.

Figure 1:
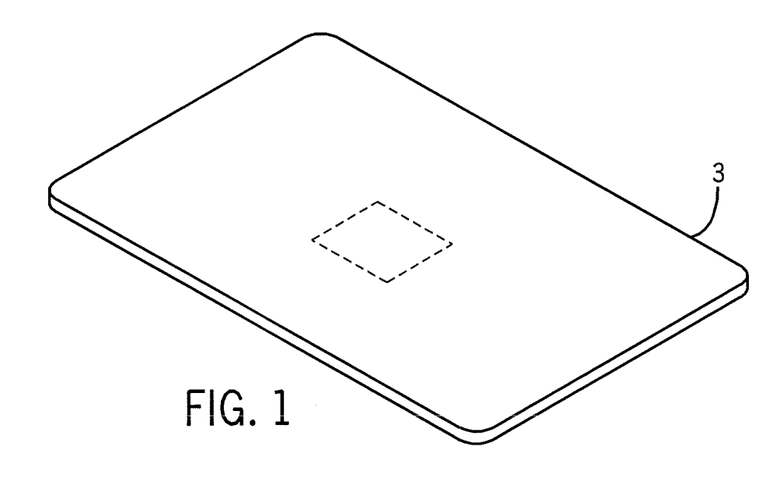
FIG. 1 is a top and side perspective view of a financial card with embedded circuit lock technology.

The dielectric layer 30 is used as the single buffer layer in simple structures such as that shown in FIGS. 1 and 2. However, in more complex structures, more buffer layers are needed. Circuit elements such as circuit traces, discreet components such as resistors and capacitors typically have thicknesses less that 0.005", often less than 0.002" which can be absorbed within the structure without providing specific buffer layers to account for these elements. This is accomplished through the formability of the buffer layers which typically flow around small deviations in thickness and result in acceptable finished card appearance and meet all ISO standards.

Figure 6:
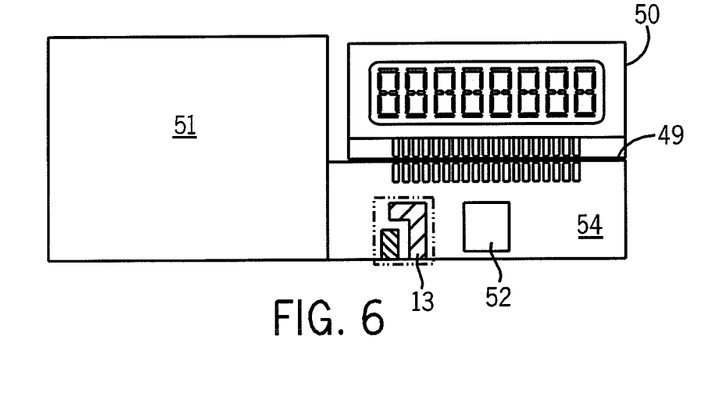
FIG. 6 shows a plan view of a circuit diagram of a display card that employs the circuit of the claimed invention.
Figure 7:
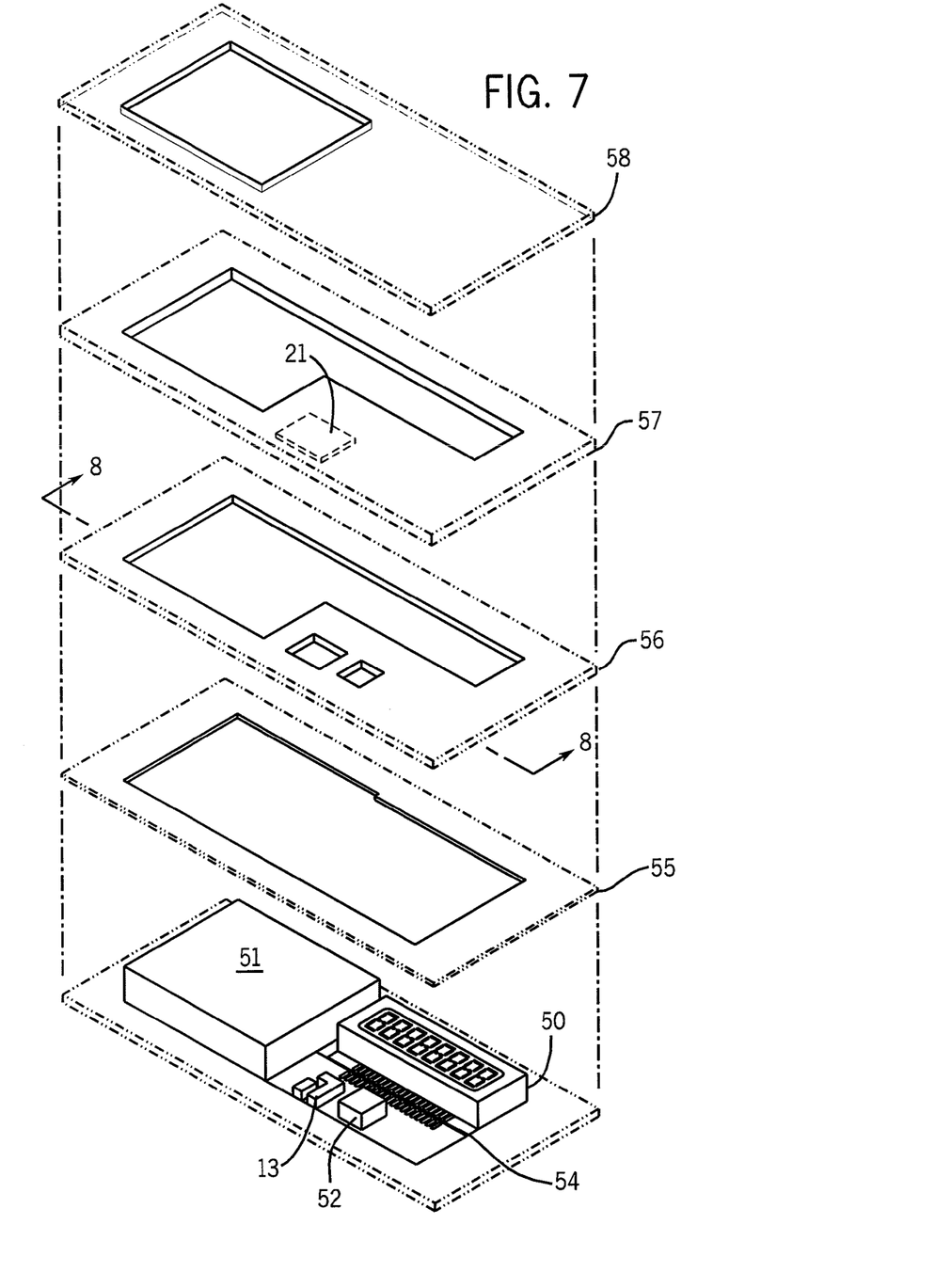
FIG. 7 is a top and side exploded view of the construction of a financial card with embedded circuit lock techonology.
Figure 8:
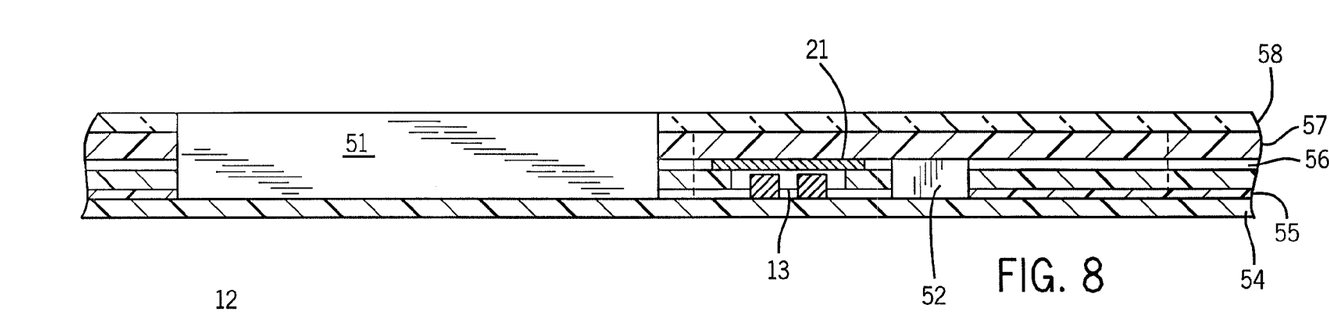
FIG. 8 is a side cross-sectional view of the financial card shown in FIG. 7.

FIG. 6 shows a complex circuit 49 for use with a credit card. Such circuits can be used to generate, for example, but not by way of limitation, a unique pin number on a transactional basis or to show the balance on the account following a transaction, among other potential uses. The circuit 49 comprises a display 50, a battery 51, and microprocessor 52 which are all electrically connected via attached to printed circuit board ("PCB") 54. The circuit lock 53 shown in FIGS. 7 is etched into PCB 54. The approximate thicknesses of the components of the circuit 49 shown in FIG. 6 are listed in the following table.

| Component | Component Thickness (inches) | Buffer Layer Thickness (inches) |
|---|---|---|
| PCB (54) | 0.003" | 0.003" |
| Display (50) | 0.016" | 0.006" |
| Microprocessor (52) | 0.007" | Dielectric (30) 0.007" |
| Battery (51) | 0.018 | 0.002" |

As shown in FIG. 7, the three dimensional structure is built by assembling the card body 3 with buffer layers to embed the electronic structure within the card body 3. More particularly, the card body 3 is assembled by first die cutting the outline of the PCB 54, the display 50 and the battery 51 from 0.003" buffer film 55 to match the height of the PCB and so as to begin to absorb the thickness of the thicker components in the structure. The second layer in the structure is the dielectric 56 which is die cut to match the outline of the display 50, the battery 51, the microprocessor 52 and the aperture required for the circuit lock 13. With this layer, the thickness of the PCB 54 is absorbed, the microprocessor 52 is fully absorbed and 0.010 inches (0.003+0.007inches) of both the battery 51 and display 50 are adequately buffered. The next layer is a buffer layer 57 which is 0.006 inches die cut to match the display and battery outline. Additionally, bridge circuit 21 is produced on the bottom of this layer which is aligned with the contact leads 14, 15 of the antenna 11 and the aperture 31 in the dielectric layer 56. With this layer, the display 50 is fully absorbed and 0.002" remains for the battery 51 which is absorbed in the final buffer layer 58.

Figure 9:
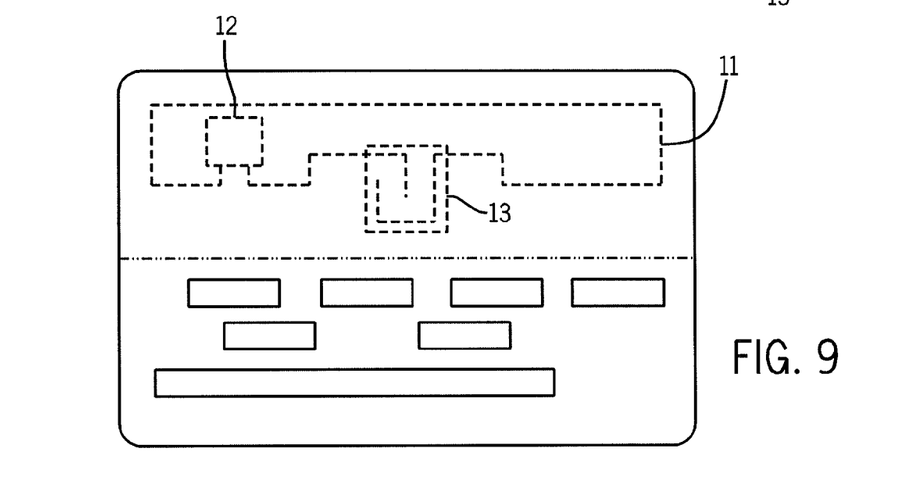
FIG. 9 is schematic view showing the circuit diagram for the financial card shown in FIG. 7.

Obviously, a wide range of electronic circuits can be embedded within a card body with varying degrees of complexity. In some cases, such as a contactless financial card, a single buffer layer is adequate to embed the desired components. For example, one preferred embodiment is shown in FIG. 9, which shows a top view of a card body wherein the bottom portion 4 of the card body is embossed with standard information including an account number, member initiation date, expiration date and name. The top portion 5 of the card body 3 is cut away, showing antenna 11 and RFID chip 12 in electrical connection as well as the conductive leads 14, 15 of the claimed invention. FIG. 6B is an additional cutaway view of the dielectric layer 30, which shows an aperture generally situated in along the centerline of the card body 3. FIG. 6C is yet third cutaway view of the second substrate layer 20 showing the bridge circuit 21 which operates to actuate the antenna 11 and which in turn actuates the RFID ship when the card body 3 is flexed such that the bridge circuit 21 makes contact with the conductive leads 14, 15 of the antenna.

Since the structures for various electronic circuits can vary considerably, the circuit lock 13 mechanism of the current invention requires design flexibility. As described earlier, the circuit lock 13 comprises a first substrate layer 10 comprising an antenna 11 and an RFID chip, a second substrate layer 20 comprising a bridge circuit 21 that overlays the contacts 14, 15 of the antenna and a dielectric layer situated between the first substrate 10 and the second substrate 20, the dielectric layer comprising an aperture of suitable size to permit the bridge 21 to complete the antenna circuit when the card body 3 in which the circuit lock 13 is situated is flexed.

Modern card manufacturing techniques have adopted a manufacturing technique which utilizes a preliminary step of producing an inlay, prelam or other such element to pre-embed electronic components into a separate structure. In this approach, a structure which typically ranges in thickness from 0.015-0.020 inches is produced separately. The attractiveness of this approach is to isolate the complexities of embedding electronic circuits into a sub-assembly which greatly simplifies the final card manufacturing steps since the graphics printing steps are isolated and does not result in additional scrap generation by combining several complex manufacturing into one process. Inlay production is completed and all scrap is removed from this production process. Graphic layer production is completed and all scrap is removed from this process. The final production process uses known good inlay sheets with known good graphics sheets thereby resulting in an overall improvement in manufacturing efficiency.

The above detailed description of the manufacturing process to embed circuit lock technology into financial cards is easily adapted to the use of the inlay manufacturing process. In this case, the structure is designed to produce an element which results in a structure which meets the inlay thickness specifications.

The above description details the use of the circuit lock 13 electrical mechanism in a wide range of electronic card applications. It will be understood that those skilled in the art will be able to make minor material substitutions, manufacturing process adjustments and positional variations which respect to the above disclosure but such minor variations will still be within the scope of the above disclosure.

We claim:

1. An inlay for use with a proximity payment card comprising:
    a flexible substrate layer comprising an antenna, the antenna comprising a first conductive lead and a second conductive lead and a space therebetween sufficient to interrupt transmission of the antenna;
    an RFID chip electrically coupled to the antenna;
    a flexible dielectric layer comprising a central aperture situated on top of the substrate layer;
    a flexible bridge circuit layer situated on top of the dielectric layer, the bridge circuit layer comprising a bridge, the bridge being situated over the first conductive lead and the second conductive lead, the bridge being biased away from the first conductive lead and the second conductive lead in a first position and biased against the first conduct lead and the second conductive lead in a second position when the inlay is flexed.

2. The inlay for use with a proximity payment card of claim 1 wherein the dielectric layer is between 0.003 and 0.006 inches and the aperture has a width of between 0.125 and 0.250 inches.

3. The inlay for use with a proximity payment card of claim 1 wherein the dielectric layer is between 0.006 and 0.0010 inches and the aperture has a width of between 0.200 and 0.325 inches.

4. The inlay for use with a proximity payment card of claim 1 wherein the dielectric layer is between 0.010 and 0.015 inches and the aperture has a width of between 0.300 and 0.050 inches.

5. The inlay for use with a proximity payment card of claim 1 wherein the inlay is encased in a resiliently flexible plastic.

6. A contactless RFID card comprising:
a circuit encased within a card body comprising
a flexible substrate layer comprising an antenna, the antenna comprising a first conductive lead and a second conductive lead and a gap therebetween sufficient to interrupt transmission of the antenna;
an RFID chip electrically coupled to the antenna;
a flexible dielectric layer comprising a central aperture situated on top of the substrate layer; and
a flexible bridge circuit layer situated on top of the dielectric layer, the bridge circuit layer comprising a bridge, the bridge being situated over the first conductive lead and the second conductive lead, the bridge being biased away from the first conductive lead and the second conductive lead in a first position and biased against the first conduct lead and the second conductive lead in a second position when the circuit inlay is flexed.

7. The contactless card of claim 6 wherein the dielectric layer is between 0.003 and 0.006 inches and the aperture has a width of between 0.125 and 0.250 inches.

8. The contactless card of claim 6 wherein the dielectric layer is between 0.006 and 0.0010 inches and the aperture has a width of between 0.200 and 0.325 inches.

9. The contactless card of claim 6 wherein the dielectric layer is between 0.010 and 0.015 inches and the aperture has a width of between 0.300 and 0.050 inches.

10. The contactless card of claim 6 wherein the inlay is encased in a resiliently flexible plastic.

11. A flex-actuated contactless card comprising:
a resiliently flexible body having a first end and a second end and a center portion;
an antenna embedded in the body comprising a first conductive lead and a second conductive lead, the first conductive lead and the second conductive lead being situated within the center portion of the flexible body and being separated by a gap sufficient to interrupt the transmission of the antenna;
a radio frequency identification (RFID) chip embedded in the body, the antenna being coupled to the RFID chip;
a bridge embedded in the center portion of the body;
a dielectric layer embedded in between the antenna and the bridge, the dielectric layer comprising an aperture, the aperture being situated between the first conductive lead and the second conductive lead of the antenna and the bridge, the bridge being biased away from the first conductive lead and the second conductive lead in a first position wherein the body is generally flat, the bridge being biased into contact with the first conductive lead and the second conductive lead when the first end of the flexible body is biased towards the second end of the flexible body to complete the antenna circuit.

12. The flex-actuated contactless card of claim 11 wherein the dielectric layer is between 0.003 and 0.006 inches and the aperture has a width of between 0.125 and 0.250 inches.

13. The flex-actuated contactless card of claim 11 wherein the dielectric layer is between 0.006 and 0.0010 inches and the aperture has a width of between 0.200 and 0.325 inches.

14. The flex-actuated contactless card of claim 11 wherein the dielectric layer is between 0.010 and 0.015 inches and the aperture has a width of between 0.300 and 0.050 inches.

15. The flex-actuated contactless card of claim 11 wherein the inlay is encased in a resiliently flexible plastic.

16. An electronic card comprising:
a circuit encased within a card body comprising
a flexible substrate layer comprising a circuit, the circuit comprising a first conductive lead and a second conductive lead and a gap there between sufficient to interrupt electrical continuity of the circuit;
at least one component which is activated by electrical power;
a flexible dielectric layer comprising a central aperture situated on top of the substrate layer; and
a flexible bridge circuit layer situated on top of the dielectric layer, the bridge circuit layer comprising a bridge, the bridge being situated over the first conductive lead and the second conductive lead, the bridge being biased away from the first conductive lead and the second conductive lead in a first position and biased against the first conduct lead and the second conductive lead in a second position when the circuit inlay is flexed.

17. The electronic card of claim 16 wherein the dielectric layer is between 0.003 and 0.006 inches and the aperture has a width of between 0.125 and 0.250 inches.

18. The electronic card of claim 16 wherein the dielectric layer is between 0.006 and 0.0010 inches and the aperture has a width of between 0.200 and 0.325 inches.

19. The electronic card of claim 16 wherein the dielectric layer is between 0.010 and 0.015 inches and the aperture has a width of between 0.300 and 0.050 inches.

20. The electronic card of claim 16 wherein the inlay is encased in a resiliently flexible plastic.

21. An inlay for use with an electronic card comprising:
a flexible substrate layer comprising a circuit, the circuit comprising a first conductive lead and a second conductive lead and a gap there between sufficient to interrupt electrical continuity of the circuit;
at least one component which is activated by electrical power;
a flexible dielectric layer comprising a central aperture situated on top of the substrate layer; and
a flexible bridge circuit layer situated on top of the dielectric layer, the bridge circuit layer comprising a bridge, the bridge being situated over the first conductive lead and the second conductive lead, the bridge being biased away from the first conductive lead and the second conductive lead in a first position and biased against the first conduct lead and the second conductive lead in a second position when the circuit inlay is flexed.

22. The inlay for use with a proximity payment card of claim 21 wherein the dielectric layer is between 0.003 and 0.006 inches and the aperture has a width of between 0.125 and 0.250 inches.

23. The inlay for use with a proximity payment card of claim 21 wherein the dielectric layer is between 0.006 and 0.0010 inches and the aperture has a width of between 0.200 and 0.325 inches.

24. The inlay for use with a proximity payment card of claim 21 wherein the dielectric layer is between 0.010 and 0.015 inches and the aperture has a width of between 0.300 and 0.050 inches.

25. The inlay for use with a proximity payment card of claim 21 wherein the inlay is encased in a resiliently flexible plastic.

* * * * *